(12) United States Patent
Hecht et al.

(10) Patent No.: US 6,332,356 B1
(45) Date of Patent: Dec. 25, 2001

(54) MEASURING DEVICE FOR MEASURING THE MASS OF A MEDIUM FLOWING IN A LINE

(75) Inventors: Hans Hecht, Korntal-Muenchingen; Wolfgang Mueller, Rutesheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,401

(22) PCT Filed: Jan. 22, 1999

(86) PCT No.: PCT/DE99/00146

§ 371 Date: Dec. 7, 1999

§ 102(e) Date: Dec. 7, 1999

(87) PCT Pub. No.: WO99/53274

PCT Pub. Date: Oct. 21, 1999

(30) Foreign Application Priority Data

Apr. 8, 1998 (DE) .............................................. 198 15 654

(51) Int. Cl.[7] ...................................................... G01F 1/68
(52) U.S. Cl. .......................................... 73/202.5; 73/118.2
(58) Field of Search ................................... 73/202, 202.5, 73/204.22, 118.2

(56) References Cited

U.S. PATENT DOCUMENTS

| 5,231,871 | * | 8/1993 | Arai et al. | 73/118.2 |
| 5,467,648 | * | 11/1995 | Igarashi et al. | 73/202.5 |
| 5,804,718 | * | 9/1998 | Nagasaka et al. | 73/202 |

* cited by examiner

*Primary Examiner*—Harshad Patel
(74) *Attorney, Agent, or Firm*—Ronald E. Greigg

(57) ABSTRACT

A measuring device for measuring the mass of a medium flowing in a flow line, in particular the aspirated air mass of an internal combustion engine, including a measuring element bathed by the flowing medium and disposed in a flow conduit of the measuring device provided in the flow line. The flow conduit extends in a primary flow direction between an inlet opening that communicates with the flow line and at least one outlet opening that discharges into the flow line downstream of the inlet opening. The flow conduit branches at a first dividing point, disposed between the inlet opening and the measuring element, into a measuring conduit, in which the measuring element is disposed, and a first bypass conduit, which bypasses the measuring element in the primary flow direction.

19 Claims, 4 Drawing Sheets

MEASURING DEVICE FOR MEASURING THE MASS OF A MEDIUM FLOWING IN A LINE

PRIOR ART

The invention is based on a measuring device for measuring the mass of a medium flowing in a line, also known as a flow rate meter. From German Patent DE 44 07209 C2, a measuring device is already known in which a flow conduit is integrated with a measuring module. The flow conduit receives the measuring element and tapers increasingly in the flow direction, beginning at an inlet opening. The tapered portion is adjoined by the S-shaped deflection conduit, which has a rectangular cross-sectional profile. The measuring module is embodied as a plug-in component. A substrate part of the measuring module can be inserted sealingly into the wall of the line to be measured and receives an electronic evaluation circuit.

As the measuring element, a micromechanical component, of the kind known for instance from German Patent Disclosure DE 43 38 891 A1, is especially suitable. In the measuring element known from DE 43 38 891 A1, two temperature-sensitive resistors are integrated; they can for instance comprise silicon oxide or silicon nitride, and they have low thermal conductivity and a low specific thermal capacity. The two temperature-sensitive resistors are thermally insulated from one another by a silicon frame. While one of the temperature-dependent resistors acts as the actual measuring sensor, the second temperature-dependent resistor serves as the sensor for the flowing medium.

From German Patent DE 36 27 465 C2, it is known to incline a measuring element for measuring the air quantity in an intake conduit by a predetermined angle relative to the flow direction, in order to reduce the adhesion of suspended particles to the measuring element. It is also known from this patent to provide the end faces of the measuring element both facing toward and away from the air stream with wedge-like protrusions, once again to lessen the adhesion of suspended particles in the air stream. From German Patent DE 39 41 330 C2, it is known to incline the surface of a temperature-sensitive measuring element by a predetermined angle relative to the flow direction of the medium to be measured. Since the angle dependency of the measuring characteristic is relatively great if the measuring element is inclined only slightly relative to the flow direction, or in an extreme case is oriented parallel to the flow direction, yet at greater angles of inclination between the measuring surface of the measuring element and the flow direction of the medium the angle dependency of the measuring characteristic is less, the teaching of this Patent yields a relatively reliable, replicable measurement result if the angle between the flow direction of the medium and the measuring surface of the measuring element is within a range of between 20° and 60°.

The known measuring devices have the disadvantage, however, that the measuring element can be destroyed by dirt particles, especially dust particles, and trained in the flowing medium, if the dirt particles collide with the measuring element. Especially when micromechanical components, of the kind described for instance in DE 43 38 891 A1, are used as the measuring elements, the dirt particles can strike the relatively thin diaphragm and do lasting harm. The result can be increased wear of the measuring element and premature failure. In addition, oily or greasy dirt particles can settle on the measuring element, and particularly on its diaphragm and act as adhesion promoters for solid particles, such as dust or grains of sand, and persistently soil the measuring element. This destroys the thermal coupling between the measuring element and the flowing medium, causing a shift in the measurement characteristic curve that necessarily leads to measurement errors. If the measuring device is used to detect the aspirated air in the intake conduit of an internal combustion engine, for instance, the result can be incorrect triggering of the fuel injection valves and thus a less than optimal setting of the fuel-air mixture, so that as the measuring element becomes increasingly soiled, the engine exhaust emissions become worse.

A further disadvantage of the known measuring device is that the measurement accuracy is still not optimal in the case of pulsating flows in the line to be measured.

ADVANTAGES OF THE INVENTION

The measuring device of the invention for measuring the mass of a medium flowing in the line, has the advantage over the prior art that dirt particles entrained in the flowing medium are largely prevented from impinging on the measuring element and at least are reduced. Particularly the diaphragm of a measuring element embodied as a micromechanical component is largely protected by the provision of the invention against the collision of dirt particles entrained in the flowing medium, so that the service life of the measuring element is prolonged substantially. By dividing the flow conduit into a measuring conduit, which receives the measuring element, and a bypass conduit that bypasses the measuring element, it is attained that the dirt particles are substantially carried away through the bypass conduit and bypass the measuring element, while relatively little contaminated medium flows past the measuring element through the measuring conduit. This reduces the risk of collision of the measuring element considerably, and especially a thin, vulnerable diaphragm of the measuring element, with the dirt particles considerably. Since the incidence of oily and greasy dirt particles on the measuring element is furthermore reduced, soiling from dust and other solid particles adhering to the measuring element is largely prevented. This counteracts any change in the characteristic curve and increases the reliability of the measurement result obtained. If the measuring device is used to detect the aspirated air mass in an internal combustion engine, the engine emissions are therefore not made permanently worse.

Advantageous refinements of and improvements to the measuring device defined herein are possible with the provisions recited in hereinafter.

It is especially advantageous if the flow conduit, between the inlet opening and the dividing point at which the flow conduit branches into the measuring conduit and the bypass conduit, has a curved portion, and the measuring conduit adjoins an inner region with a relatively small radius of curvature while the bypass conduit adjoins a peripheral region with a relatively large radius of curvature of the curved portion. As a result of the centrifugal forces acting on the dirt particles in the curved portion, the dirt particles are positively displaced outward into the peripheral region, so that the peripheral region of the curved portion is contaminated with relatively many dirt particles, while the inner region of the curved portion is contaminated with relatively few dirt particles. Most of the dirt particles therefore enter the bypass conduit bypassing the measuring element, and do not enter the measuring conduit, and the contamination of the medium bathing the measuring element is reduced markedly.

As an alternative to this, it is also possible to offset the measuring conduit radially from the inlet opening relative to a longitudinal axis of the line to be measured. As a result, the measuring conduit is located largely outside the flight path of the dirt particles, which extends substantially parallel to the longitudinal axis of the line and is thus predetermined by the projection of the inlet opening parallel to the longitudinal axis of the line.

Between the measuring conduit and the bypass conduit, a partition can be provided; the bypass conduit and the measuring conduit can either reunite downstream of the measuring element and emerge at a common outlet opening, or the measuring conduit and the bypass conduit can be extended onward in the measuring device in the form of separate conduits with separate conduits with separate outlet openings. Especially when the measuring conduit and the bypass conduit unite again downstream of the measuring element to form a common flow conduit, such as an S-shaped deflection conduit, it is advantageous to make the partition streamlined in cross-sectional profile, in order to prevent flow separations and to present the least possible flow resistance to the flowing medium.

The outlet openings of the measuring conduit and of the bypass conduit are preferably disposed on a trailing end of the measuring device, which is located opposite the inlet opening disposed on a leading end.

Especially preferably, the flow conduit has a second dividing point, where the flow conduit branches off counter to the primary flow direction into the measuring conduit and a second bypass conduit. Especially in the event of pulsating flows, in which a reverse flow component counter to the primary flow direction occurs, this provision is advantageous, since then the medium flowing past the measuring element is freed of dirt particles in the reverse direction as well. To that end, a second curved portion is advantageously provided between the outlet opening and the second dividing point. The first curved portion and the second curved portion are preferably embodied symmetrically to one another, so that even in the event of a strongly reverse-pulsating flow, only a relatively slight measurement error occurs. The two curved portions and the likewise curved measuring conduit advantageously combine to form a loop that encloses an angle of approximately 360°.

BRIEF DESCRIPTION OF THE DRAWINGS

Exemplary embodiments of the invention are shown in simplified form in the drawings and described in detail in the ensuing description. Shown are.

DESCRIPTION OF THE EXEMPLARY EMBODIMENTS

Figure 1:
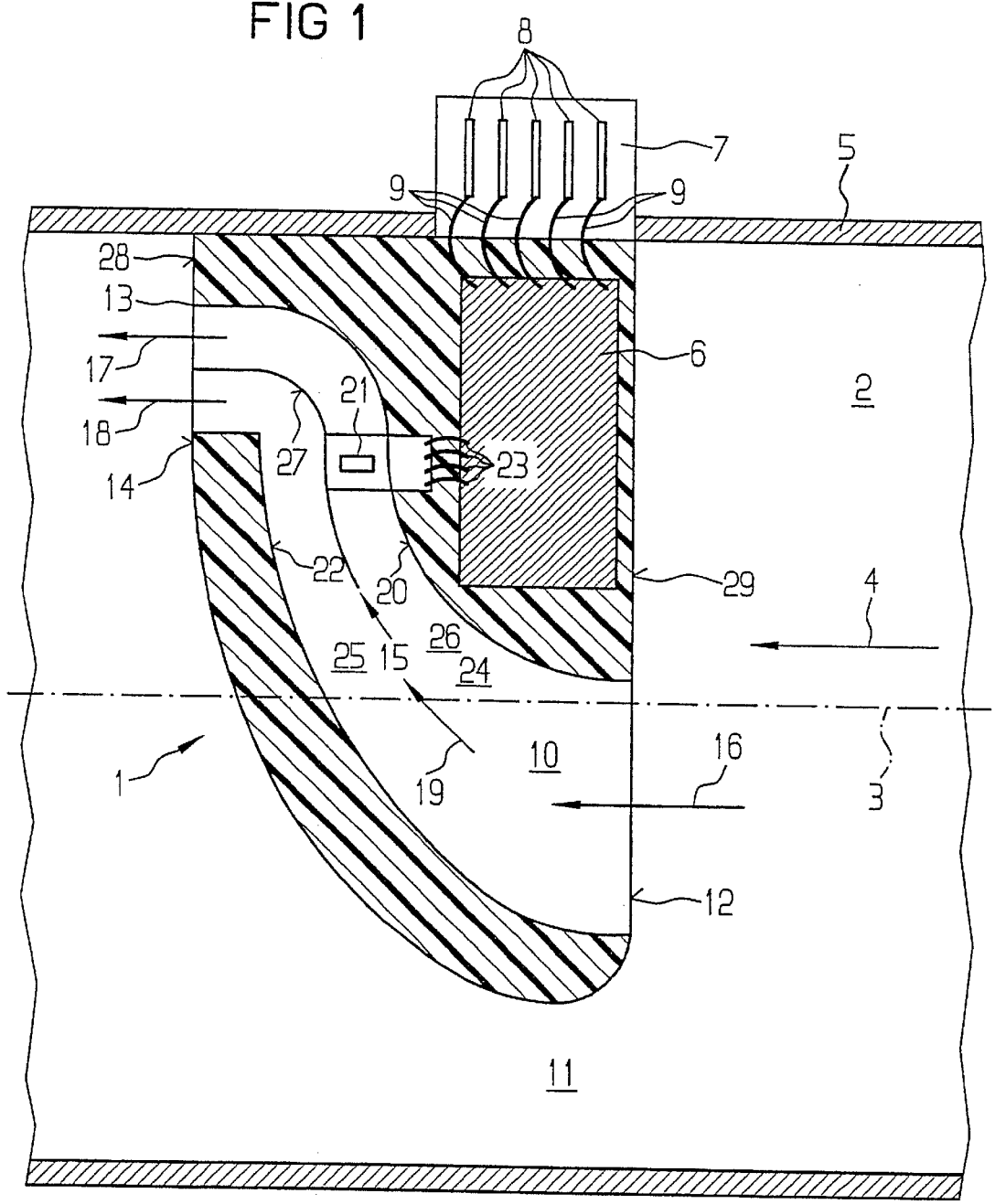
FIG. 1, a first exemplary embodiment of the measuring device of the invention in a sectional view.

FIG. 1, in a sectional view, shows a side view of a measuring device 1 according to the invention, which is used to measure the mass of a flowing medium, in particular the aspirated air mass of internal combustion engines.

The measuring device 1 detects the mass of a medium flowing in a flow line 2. The flow line 2 is shown merely schematically and extends along a longitudinal axis 3, at least in the region of the measuring device 1. The flow line 2 may for instance be an intake line of an internal combustion engine, by way of which the engine can aspirate air from the environment. In the exemplary embodiments shown, the medium, such as the aspirated air, flows from right to left through the flow line 2. The flow direction in the flow line 2 is indicated by an arrow 4.

The measuring device 1 preferably has a slender shape extending radially in the flow line 2, and it can preferably be inserted, for instance in plug-in fashion, into an opening made in the wall 5 of the flow line 2. Embodying the measuring device 1 as a plug-in module that can be plugged into the wall 5 of the flow line 2 makes especially simple installation and maintenance possible. In a preferred embodiment, an electronic evaluation circuit 6 can be integrated with the measuring device 1, for instance being cast integrally with the measuring device. It is equally conceivable to accommodate an electronic evaluation circuit outside the wall 5. Suitable contacts 8 for supplying current to the measuring device 1 and for picking up the measurement signal obtained by the measuring device 1 are provided on a plug portion 7 that protrudes from the wall 5 of the flow line 2 and are connected to the evaluation circuit 6 via connecting lines 9.

The measuring device 1 can for instance be made in one piece of plastic as a plastic injection molded part. The measuring device 1 has a flow conduit 10, which is disposed in the manner of a bypass line, parallel to the primary flow cross section 11 of the flow line 2. The flow conduit 10 extends from an inlet opening 12 to one or more outlet openings. In the exemplary embodiment shown in FIG. 1, a first outlet opening 13 and a second outlet opening 14 are provided. The primary flow direction at the inlet opening 12 is indicated by an arrow 16, and the primary flow direction at the outlet openings 13 and 14 is indicated by a respective arrow 17 and 18. The primary flow direction inside the flow conduit 10 is indicated by an arrow 19.

According to the invention, the flow conduit 10 branches at a dividing point 15 into a measuring conduit 20, in which a measuring element 21 is disposed, and a bypass conduit 22 that bypasses the measuring element. The measuring element 21 is connected to the evaluation circuit 6 via connecting lines 23 and is preferably embodied as a micromechanical component, of the kind proposed for instance in DE 43 38 891 A1. The measuring element 21 in a manner known per se has at least one but preferably two temperature-sensitive resistor elements, which are embodied on a dielectric diaphragm, for instance of silicon oxide or silicon nitride. The dielectric diaphragm has the advantage of an only slight thermal capacity and a relatively slight thermal conductivity, so that the response performance of the measuring element is relatively fast.

The measuring element 21, in the preferred exemplary embodiment shown, has a plate-like silicon-based substrate body, with a diaphragm-like sensor region created by etching and having an extremely slight thickness and having a plurality of resistor layers, also created by etching. These resistor layers form at least one temperature-dependent measuring resistor and for instance a hot resistor. The hot resistor is preferably located in the middle of the diaphragm and is regulated to an over temperature with the aid of a temperature sensor. Upstream and downstream of the hot region formed by the hot resistor, there are two measuring resistors disposed symmetrically to the hot region. The substrate body of the measuring element 21 is accommodated flush in a recess of a receptacle, for instance of metal, and is retained there, for instance by adhesive bonding. The receptacle protrudes into the measuring conduit 20, so that the measuring element 21 is bathed by the medium flowing through the measuring conduit 20 of the measuring device 1.

In the exemplary embodiment shown in FIG. 1, a first curved portion 24 is located between the inlet opening 12 and the dividing point 15; in the exemplary embodiment shown, it is curved to the right, in the primary flow direction 19. As a result, dirt particles located in the line, which invade the flow conduit 10 through the inlet opening 12, are positively displaced outward into a peripheral region 25 of the curved portion 24 by centrifugal force, because of their inertial mass. These dirt particles may be either liquid droplets, such as water droplets or oil droplets, or solid particles, such as dust. The inner region 26 of the curved portion 24, conversely, is contaminated relatively little with dirt particles, because of the positive displacement dictated by the centrifugal force.

Because the measuring conduit 20 adjoins the inner region 26 of the curved portion 24, and conversely the bypass conduit 22 that bypasses the measuring element 21 adjoins the peripheral region 25 of the curved portion 24 in the primary flow direction 19, it is attained that the medium especially contaminated with dirt particles and located in the outer region 25 of the curved portion 24 is returned into the flow line 2 via the second outlet opening 14, without the risk that the dirt particles can strike the measuring element 21 and damage it. This is especially important if the measuring element 21 is embodied as a micromechanical component as described above, with a diaphragm-like sensor region that is especially sensitive with respect to the impact of dirt particles. By the provision according to the invention, in a sense the solid or liquid phase of the flowing medium, which contains the dirt particles, is separated from the gaseous phase of the medium that is actually to be measured. Because the contaminated medium is carried away via the second outlet opening 14, it is assured that the dirt particles cannot become deposited in the bypass conduit 22 or in the peripheral region 25 of the curved portion 24, so that a self-cleaning effect is attained. In the exemplary embodiment shown in FIG. 1, the measuring conduit 20 and the bypass conduit 22 are separated by a lip-like thin partition 27. The measuring conduit 20 and the bypass conduit 22 extend largely parallel to one another, and the medium flowing through the measuring conduit 20 and the medium flowing through the bypass conduit 22 emerge from separate but adjacent outlet openings 13 and 14. The outlet openings 13 and 14 are located on a trailing end 28, facing away from the primary flow direction 4 of the flow line 2, and this end is opposite a leading end 29 facing toward the primary flow direction 4 of the flow line 2, and this is where the inlet opening 12 is located. In the exemplary embodiment shown in FIG. 1, the trailing end 28 and the lower region, in terms of FIG. 1, of the outflow end 29 have a curved cross-sectional constant, which is adapted to the flow conditions. The lip-like partition 27 is relatively simple to make from a production technology standpoint and can optionally also be inserted later into the flow conduit 10, after the forming of the flow conduit.

Figure 2:
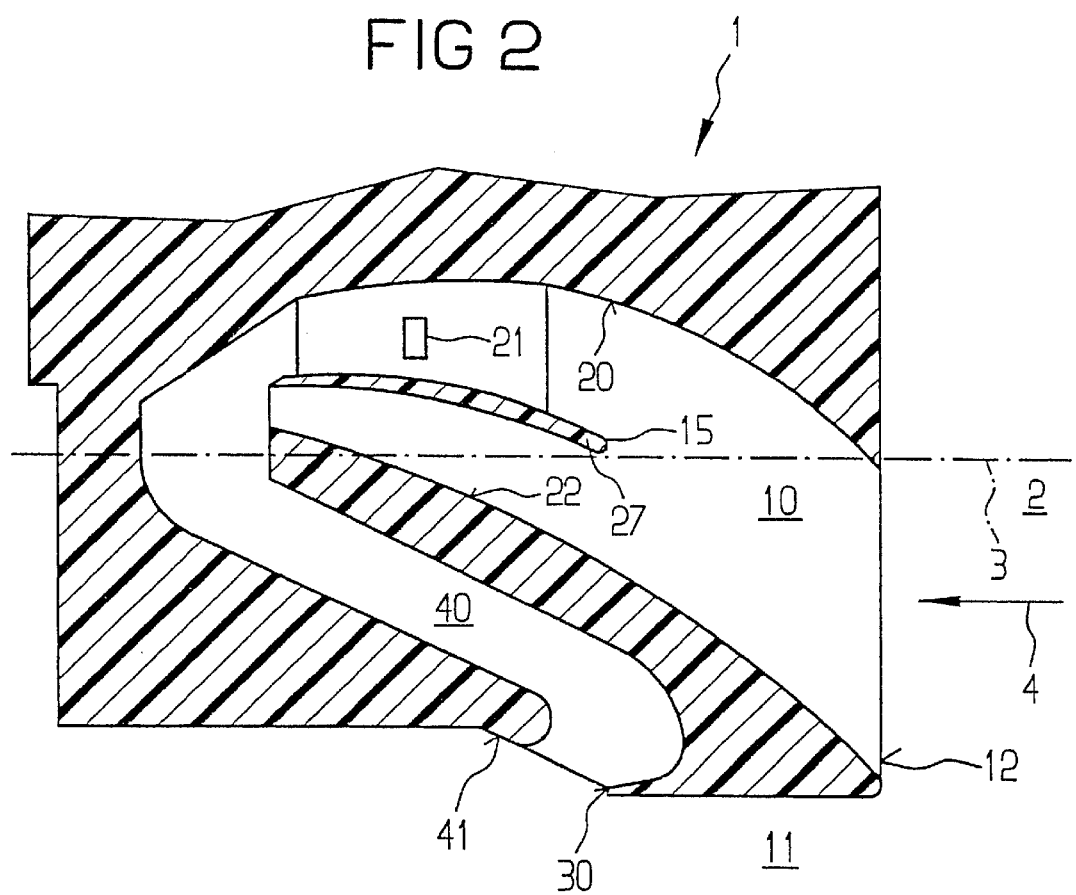
FIG. 2, a second exemplary embodiment of the measuring device of the invention in a sectional view.

FIG. 2 shows a second exemplary embodiment of the measuring device 1 of the invention. Elements already described or corresponding to them are provided with the same reference numerals.

The exemplary embodiment shown in FIG. 2 differs from the exemplary embodiment described in conjunction with FIG. 1 on the one hand in that the measuring conduit 20 that receives the measuring element 21 and the bypass conduit 22 that bypasses the measuring element 21 are reunited, downstream of the partition 27 and downstream of the measuring element 21, respectively, to form a common flow conduit in the form of an S-shaped deflection conduit 40. The outlet opening 30 of the deflection conduit 40 is located in a beveled section 41 that is in the lee relative to the primary flow direction 4 of the flow line 2. As a result of the deflection conduit 40, when there are highly pulsating flows, only slight measurement error occurs even if there is a relatively strong reverse flow component.

The exemplary embodiment shown in FIG. 2 also differs from the exemplary embodiment shown in FIG. 1 in that the introduction of the medium that is contaminated more strongly with dirt particles into the bypass conduit 22 and of the medium contaminated less or only negligibly with dirt particles in the measuring conduit 20, is effected not by means of a curved portion 24 but instead by radially offsetting the measuring conduit 20 from the inlet opening 12 relative to the longitudinal axis 3 of the line 2. Since the flight path of the dirt particles is oriented substantially parallel to the longitudinal axis 3 of the line 2, only relatively few dirt particles reach the measuring conduit 20, when the dividing point 15 is located outside the projection of the inlet opening 12, parallel to the longitudinal axis 3 of the flow line 2. In this exemplary embodiment, the partition 27 is streamlined in shape, in order to prevent flow separations and to present the least possible flow resistance to the flowing medium.

Figure 3:
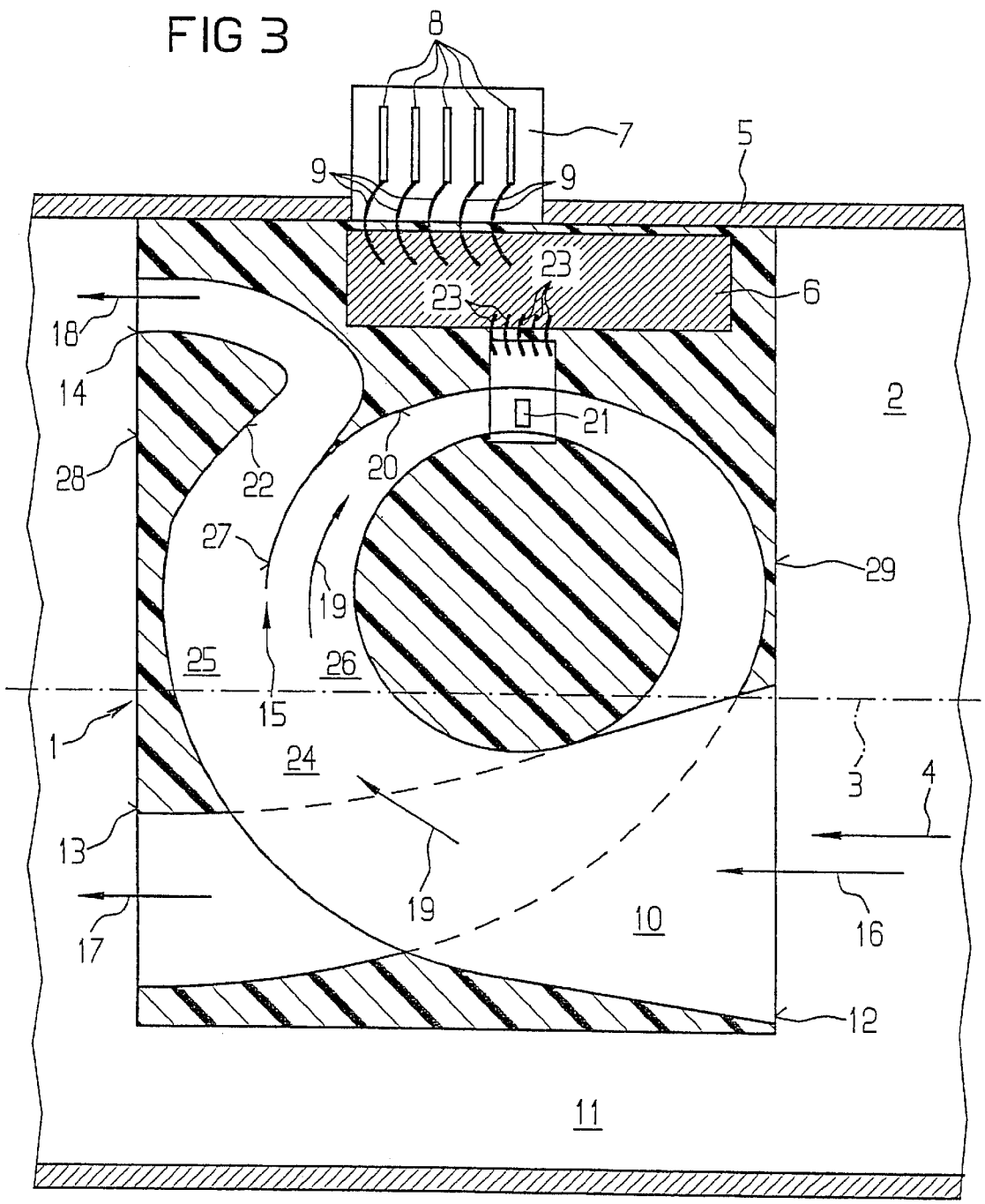
FIG. 3, a third exemplary embodiment of the measuring device of the invention in a sectional view.

FIG. 3 shows a third exemplary embodiment of the measuring device of the invention. In FIG. 3 as well, elements already described or corresponding to those already described are provided with the same reference numerals, to make it easier to find them. In a way similar to the exemplary embodiment shown in FIG. 1, the flow conduit 10 branches in the primary flow direction 19 into the measuring conduit 20, in which the measuring element 21 is disposed, and the bypass conduit 22.

The measuring conduit 20 and the first bypass conduit 22 are curved contrary to one another upstream of the dividing point 15 in the primary flow direction 19, so that the bypass conduit 22 takes a relatively short course to the second outlet opening 14 on the trailing end 28 of the measuring device 1. In the manner already described, the measuring conduit 20 adjoins an inner region and the bypass conduit 22 adjoins a peripheral region of the curved portion 24, so that because of the centrifugal force acting on the dirt particles, these particles predominantly invade the bypass conduit 22 and do not reach the measuring element 21. The curvature of the curved portion 24 continues in the measuring conduit 20, and the measuring conduit 20 together with the curved portion 24 forms a loop, extending from the inlet opening 19 to the first outlet opening 13, that forms an angle of approximately 360°.

The measuring element 21 in this exemplary embodiment is approached by a flow counter to the primary flow direction 4 in the line 2, and the measuring conduit 20 is continued in a deflection and then returned back into the flow line 2 at the outlet opening 13 in approximately the same axial position relative to the inlet opening 12, but laterally offset in accordance with the width of the flow conduit 10. The result is a virtually symmetrical design of the measuring conduit 20, as a result of which the mass of the flowing medium detected by the measuring device 1 of the invention is largely independent of the flow direction. This is especially important with highly pulsating flows that have a relatively major reverse flow, component, as is the case for instance in the intake line of an internal combustion engine. However, any flow phenomena that may occur in the vicinity of the sensor can lead to an intentionally asymmetrical embodiment of the measuring conduit 20, without sacrificing the advantages of a major reverse flow component.

Figure 4:
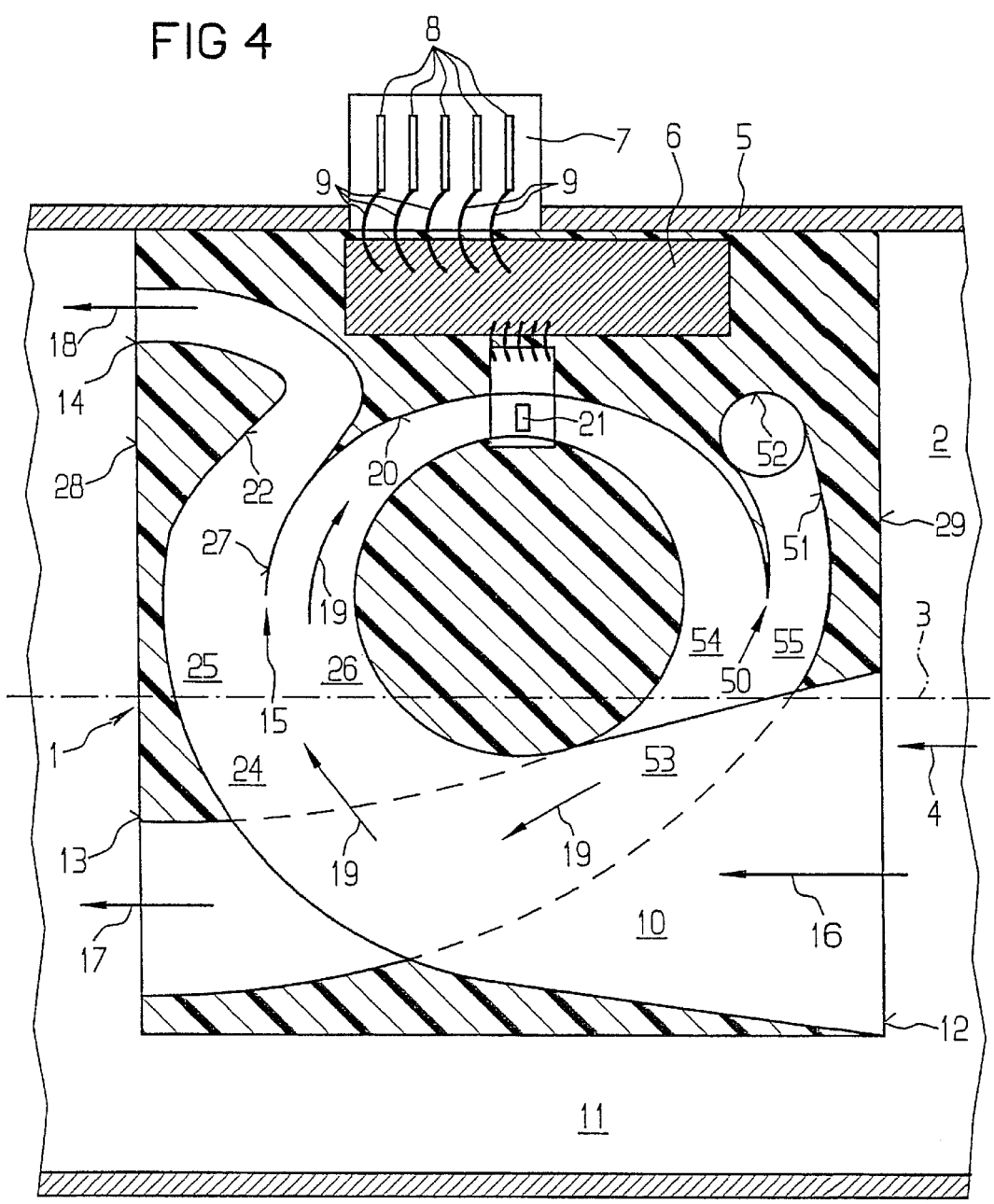
FIG. 4, a fourth exemplary embodiment of the measuring device of the invention in a sectional view.

FIG. 4 shows a fourth exemplary embodiment of the measuring device 1 of the invention. Once again, already described or equivalent elements are provided with the same reference numerals, so that in this respect repetition is unnecessary.

The exemplary embodiment shown in FIG. 4 is largely equivalent to the exemplary embodiment already described in conjunction with FIG. 3. A special feature is that not only a first dividing point 15 is provided, at which the flow conduit 10 branches in the primary flow direction 19 into the measuring conduit 20 and a first bypass conduit 21 that discharges at the outlet opening 14 and bypasses the measuring element 21. In addition, a second dividing point 50 is provided between the measuring element 21 and the first outlet opening 13; at this second dividing point, the flow conduit 10 branches counter to the primary flow direction 19 into the measuring conduit 20, in which the measuring element 21 is disposed, and a second bypass conduit 51 that bypasses the measuring element 21. In the exemplary embodiment shown, the second bypass conduit 51 discharges into the line 2 at a third outlet opening 52, at a side face of the measuring device 1 that is substantially parallel to the longitudinal axis 3 of the line 2. The second bypass conduit 51 likewise leads over a relatively short path to the associated outlet opening 52. The short paths of the two bypass conduits 21 and 51 prevent the dirt particles from becoming deposited there. Also provided in the exemplary embodiment shown in FIG. 1 is a second curved portion 53, which is disposed between the first outlet opening 13 and the second dividing point 50. The measuring conduit 20 here adjoins an inner region 54 with a relatively small radius of curvature of the second curved portion 53 counter to the primary flow direction 19, while the second bypass conduit 51 adjoins a peripheral region 55 with a relatively great radius of curvature of the second curved portion 53 counter to the primary flow direction 19.

The purpose of the second dividing point 50 and the second bypass conduit 51 is to assure, even in the presence of highly pulsating flows with a relatively major reverse flow component counter to the primary flow direction 19, that in the same way as at the first dividing point 15, dirt particles entering through the second outlet opening 13 during the reverse flow will not reach the measuring conduit 20 but will reach the second bypass conduit 51 instead, because of centrifugal force, and will emerge from the third outlet opening 52, bypassing the measuring element 21. In this way, even during the reverse flow, dirt particles briefly flowing counter to the primary flow direction 19 are reliably kept away from the measuring element 21.

The first curved portion 24 and the second curved portion 53 of the flow conduit 10 are preferably embodied substantially symmetrically. In addition, the first curved portion 24, the measuring conduit 20 and the second curved portion 53 preferably combine to form a loop that encloses an angle of approximately 360°.

The invention is not limited to the exemplary embodiments shown. The measuring conduit 20 and the bypass conduits 22 and 52 can also be embodied in some other way if that is appropriate for a particular application. Optionally it may be advantageous to provide the third outlet opening 52 on the trailing end 28 of the measuring device as well, and to lengthen the second bypass conduit 51 accordingly. The measuring device of the invention is suitable for measuring the mass of flowing media in both gaseous and liquid form.

The foregoing relates to a preferred exemplary embodiments of the invention, it being understood that other variants and embodiments thereof are possible within the spirit and scope of the invention, the latter being defined by the appended claims.

What is claimed is:

1. A measuring device (1) for measuring the mass of a medium flowing in a flow line (2) as an aspirated air mass of an internal combustion engine, comprising a measuring element (21) bathed by a portion of the flowing medium and disposed in a flow conduit (10) of the measuring device (1) provided in the flow line (2), wherein the flow conduit (10) extends in a primary flow direction (19) between an inlet opening (12) that communicates with the flow line (2) and at least one outlet opening (13; 30) that discharges into the flow line (2) downstream of the inlet opening (12), in which the flow conduit (10) branches at a first dividing point (15), disposed between the inlet opening (12) and the measuring element (21), into a measuring conduit (20), in which the measuring element (21) is disposed, and a first bypass conduit (22), which bypasses the measuring element (21) in the primary flow direction (19), the flow conduit (10) having a first curved portion (24) at least between the inlet opening (12) and the first dividing point (15), the measuring conduit (20) adjoining an inner region (26) with a relatively lesser radius of curvature of the first curved portion (24) in the primary flow direction (19), and the first bypass conduit (22) adjoins a peripheral region (25) with a relatively large radius of curvature of the first curved portion (24) in the primary flow direction (19).

2. The measuring device according to claim 1, in which the measuring conduit (20) is radially offset from the inlet opening (12) relative to a longitudinal axis (3) of the flow line (2).

3. The measuring device according to claim 1, in which a partition (27) is disposed in the primary flow direction (19) downstream of the first dividing point (15), between the measuring conduit (20) and the first bypass conduit (22).

4. A measuring device (1) for measuring the mass of a medium flowing in a flow line (2) as an aspirated air mass of an internal combustion engine, comprising a measuring element (21) bathed by a portion of the flowing medium and disposed in a flow conduit (10) of the measuring device (1) provided in the flow line (2), wherein the flow conduit (10) extends in a primary flow direction (19) between an inlet opening (12) that communicates with the flow line (2) and at least one outlet opening (13; 30) that discharges into the flow line (2) downstream of the inlet opening (12), in which the flow conduit (10) branches at a first dividing point (15), disposed between the inlet opening (12) and the measuring element (21), into a measuring conduit (20), in which the measuring element (21) is disposed, and a first bypass conduit (22), which bypasses the measuring element (21) in the primary flow direction (19), the measuring conduit (20) being radially offset from the inlet opening (12) relative to a longitudinal axis (3) of the flow line (2).

5. The measuring device according to claim 4, in which a partition (27) is disposed in the primary flow direction (19) downstream of the first dividing point (15), between the measuring conduit (20) and the first bypass conduit (22).

6. A measuring device (1) for measuring the mass of a medium flowing in a flow line (2) as an aspirated air mass of an internal combustion engine, comprising a measuring element (21) bathed by a portion of the flowing medium and disposed in a flow conduit (10) of the measuring device (1) provided in the flow line (2), wherein the flow conduit (10) extends in a primary flow direction (19) between an inlet opening (12) that communicates with the flow line (2) and at least one outlet opening (13; 30) that discharges into the flow line (2) downstream of the inlet opening (12), in which the flow conduit (10) branches at a first dividing point (15), disposed between the inlet opening (12) and the measuring element (21), into a measuring conduit (20), in which the measuring element (21) is disposed, a first bypass conduit (22), which bypasses the measuring element (21) in the primary flow direction (19), and a partition (27) disposed in the primary flow direction (19) downstream of the first dividing point (15), between the measuring conduit (20) and the first bypass conduit (22).

7. The measuring device according to claim 6, in which the measuring conduit (20) and the first bypass conduit (22) are reunited in the primary flow direction (19) downstream of the measuring element (21).

8. The measuring device according to claim 7, in which the partition (27) is streamlined in cross-sectional profile.

9. A measuring device (1) for measuring the mass of a medium flowing in a flow line (2) as an aspirated air mass of an internal combustion engine, comprising a measuring element (21) bathed by a portion of the flowing medium and disposed in a flow conduit (10) of the measuring device (1) provided in the flow line (2), wherein the flow conduit (10) extends in a primary flow direction (19) between an inlet opening (12) that communicates with the flow line (2) and at least one outlet opening (13; 30) that discharges into the flow line (2) downstream of the inlet opening (12), in which the flow conduit (10) branches at a first dividing point (15), disposed between the inlet opening (12) and the measuring element (21), into a measuring conduit (20), in which the measuring element (21) is disposed, and a first bypass conduit (22), which bypasses the measuring element (21) in the primary flow direction (19), the measuring conduit (20) and the first bypass conduit (22) extending substantially parallel to one another in the primary flow direction (19) downstream of the first dividing point (15) and discharging at a common outlet opening or at two adjacent outlet openings (13, 14).

10. The measuring device according to claim 9, in which the inlet opening 12 is disposed on a leading end 29 of the measuring device 1, and the outlet openings (13, 14) of the measuring conduit (20) and the first bypass conduit (22) are disposed on a trailing end (28) of the measuring device, located opposite the leading end (29).

11. A measuring device (1) for measuring the mass of a medium flowing in a flow line (2) as an aspirated air mass of an internal combustion engine, comprising a measuring element (21) bathed by a portion of the flowing medium and disposed in a flow conduit (10) of the measuring device (1) provided in the flow line (2), wherein the flow conduit (10) extends in a primary flow direction (19) between an inlet opening (12) that communicates with the flow line (2) and at least one outlet opening (13; 30) that discharges into the flow line (2) downstream of the inlet opening (12), in which the flow conduit (10) branches at a first dividing point (15), disposed between the inlet opening (12) and the measuring element (21), into a measuring conduit (20), in which the measuring element (21) is disposed, and a first bypass conduit (22), which bypasses the measuring element (21) in the primary flow direction (19), the measuring conduit (20) and the first bypass conduit (22) extending with contrary curvature in a region downstream of the first dividing point (15) in the primary flow direction (19) and discharging at spatially separated outlet openings (13, 14).

12. The measuring device according to claim 11, in which the inlet opening 12 is disposed on a leading end 29 of the measuring device 1, and the outlet openings (13, 14) of the measuring conduit (20) and the first bypass conduit (22) are disposed on a trailing end (28) of the measuring device, located opposite the leading end (29).

13. A measuring device (1) for measuring the mass of a medium flowing in a flow line (2) as an aspirated air mass of an internal combustion engine, comprising a measuring element (21) bathed by a portion of the flowing medium and disposed in a flow conduit (10) of the measuring device (1) provided in the flow line (2), wherein the flow conduit (10) extends in a primary flow direction (19) between an inlet opening (12) that communicates with the flow line (2) and at least one outlet opening (13; 30) that discharges into the flow line (2) downstream of the inlet opening (12), in which the flow conduit (10) branches at a first dividing point (15), disposed between the inlet opening (12) and the measuring element (21), into a measuring conduit (20), in which the measuring element (21) is disposed, and a first bypass conduit (22), which bypasses the measuring element (21) in the primary flow direction (19), the flow conduit (10) branching, at a second dividing point (50) disposed between an outlet opening (13) and the measuring element (21), into the measuring conduit (20) having the measuring element (21) and a second bypass conduit (51), which bypasses the measuring element (21) counter to the primary flow direction (19).

14. The measuring device according to claim 13, in which the flow conduit (10) has a second curved portion (53) between the outlet opening (13) and the second dividing point (50), and that the measuring conduit (20) adjoins an inner region (54) with a relatively lesser radius of curvature of the second curved portion (53) counter to the primary flow direction (19), and the second bypass conduit (51) adjoins a peripheral region (55) with a relatively large radius of curvature of the second curved portion (53) counter to the primary flow direction (19).

15. The measuring device according to claim 14, in which the first curved portion (24) and the second curved portion (53) of the flow conduit (10) are embodied substantially symmetrically to one another.

16. The measuring device according to claim 15, in which the measuring conduit (20) is embodied as curved in at least some portions, and that the first curved portion (24) and the second curved portion (53) of the flow conduit (10) together with the curved measuring conduit (20) make a loop that encloses an angle of approximately 360°.

17. The measuring device according to claim 14, in which the measuring conduit (20) is embodied as curved in at least some portions, and that the first curved portion (24) and the second curved portion (53) of the flow conduit (10) together with the curved measuring conduit (20) make a loop that encloses an angle of approximately 360°.

18. The measuring device according to claim 14, in which the second bypass conduit (51) discharges into the flow line (2) at a side face of the measuring device (1) disposed substantially parallel to a longitudinal axis (3) of the flow line (2).

19. The measuring device according to claim 13, in which the second bypass conduit (51) discharges into the flow line (2) at a side face of the measuring device (1) disposed substantially parallel to a longitudinal axis (3) of the flow line (2).

* * * * *